UNITED STATES PATENT OFFICE.

GEO. H. COOK, OF NEW BRUNSWICK, NEW JERSEY.

IMPROVEMENT IN COMPOSITIONS FOR LINING TOBACCO-PIPES.

Specification forming part of Letters Patent No. 34,106, dated January 7, 1862.

*To all whom it may concern:*

Be it known that I, GEORGE H. COOK, of the city of New Brunswick, in the county of Middlesex and State of New Jersey, have invented a new Composition for the Lining of Tobacco-Pipes; and I do hereby declare that the following is a full and exact description thereof.

The object of this invention is to prepare a composition for the lining of tobacco-pipes which shall possess the useful properties of plaster-of-paris in "setting" and capability of being worked in a lathe, and still be free from the objectionable property which plaster has of decaying or rotting under the influence of the moisture which condenses in the stem and at the bottom of the pipe.

The composition which I employ consists substantially of a mixture of plaster-of-paris and hydraulic cement or water-lime. The proportions of the two substances to each other which I have used in some instances are equal parts, by weight, of each; but they may be varied according to their qualities and the mode and time in which the composition is worked, using always the largest amount of the hydraulic cement or water-lime that is consistent with the setting of the composition in a reasonable time and its proper working in a lathe. Fine sand or any stony substance may be added in the composition to increase its strength and hardness, and earths, metallic oxides, or other substances to improve its color and closeness of texture. The composition is worked up with water or other fluid in the same way that plaster of-paris is usually worked.

What I claim as my invention, and desire to secure by Letters Patent, is—

The use of the above-described composition for the lining of tobacco-pipes.

GEO. H. COOK.

Witnesses:
MARTIN NEVINS,
N. WILLIAMSON.